March 23, 1948.  L. I. MENDELSOHN  2,438,372
PRECISION MAGNETOMETER
Filed Oct. 1, 1945
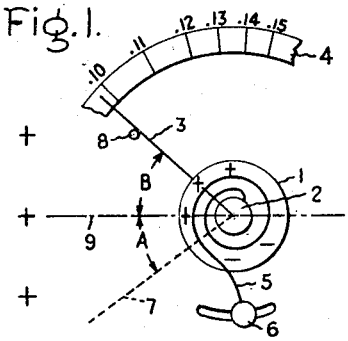
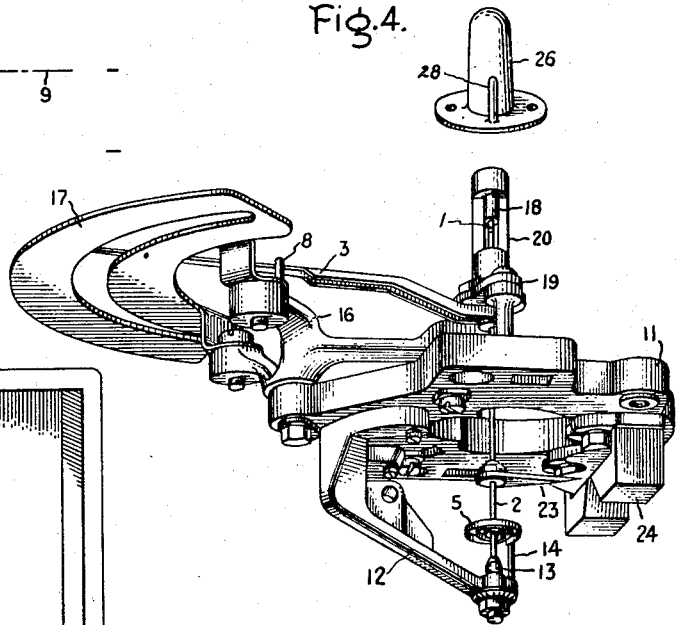
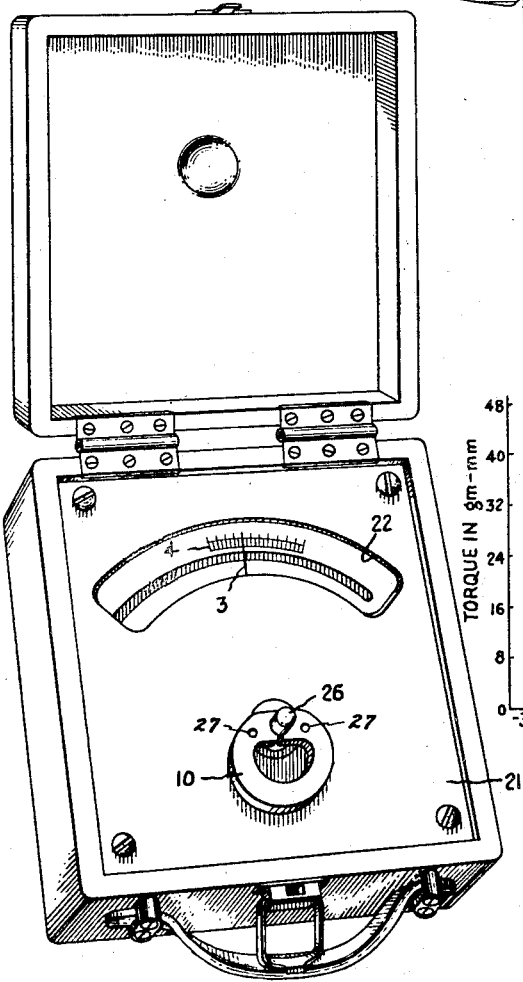
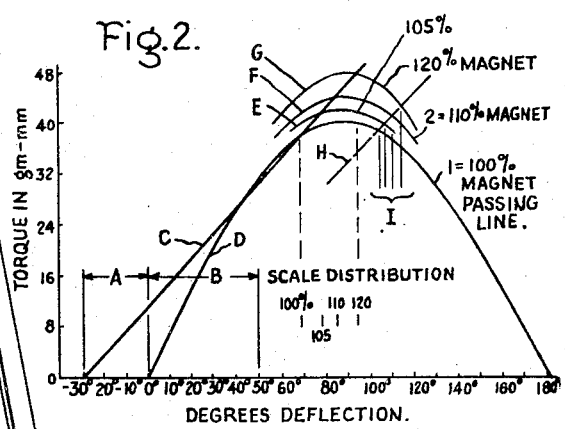
Inventor:
Lewis I. Mendelsohn,
by Crowell & Mack
His Attorney.

Patented Mar. 23, 1948

2,438,372

UNITED STATES PATENT OFFICE 2,438,372

PRECISION MAGNETOMETER

Lewis I. Mendelsohn, Lynn, Mass., assignor to General Electric Company, a corporation of New York Application October 1, 1945, Serial No. 619,659

2 Claims. (Cl. 175—183)

My invention relates to an instrument for measuring the strength of unidirectional flux fields with high accuracy and is particularly useful for the accurate measurement of small differences or changes in field strength such, for example, as might occur in a lot of permanent magnets, presumably all made alike but having final field strengths varying over a range of say 20%.

In carrying my invention into effect, I provide a flux field measuring instrument having a permanent magnet armature with a restraining spring, a pointer, and a calibrated scale with which the pointer cooperates. The restraining spring is adjusted to produce a negative suppressed zero torque, but the pointer is prevented from a suppressed zero indication by a pointer or armature stop. Such instrument is placed in the flux field to be measured with the polarized armature axis in a direction partially opposing the field to be measured. For highest accuracy the instrument is used over a measurement range where the measuring torque increases with upscale deflection and approaches its maximum value for a given strength of the fields to be measured.

The features of my invention which are believed to be novel and patentable will be pointed out in the claims appended hereto. For a better understanding of my invention, reference is made in the following description of the accompanying drawing in which Fig. 1 represents a schematic plan view of the essential parts of my magnetometer as oriented into measurement position in a flux field to be measured; Fig. 2 shows torque deflection curves of an instrument embodying my invention which will be referred to in explaining the measurement operation; Fig. 3 is a perspective face view of one of my instruments and carrying case with the cover open as adapted for testing permanent magnets and showing a permanent magnet in test position; Fig. 4 is a perspective view showing features of the internal construction of the instrument of Fig. 3.

A schematic illustration of the instrument of my invention and the manner of placing it in a magnetic field to be measured is shown in Fig. 1. One (1) represents a permanent magnet rotor polarized across a diameter as represented by the plus and minus polarity marks thereon. The rotor is mounted on or is part of a shaft 2 which is pivoted for rotation in suitable bearings. The rotor is provided with a pointer 3 which for convenience extends in the direction of the line of polarization of the rotor and cooperates with a stationary scale 4. The armature and pointer are biased to rotate in a counterclockwise direction from the position shown by a spiral spring 5 having its outer end adjustable as represented at 6. The spring adjustment is such that, if free to do so, the armature would rotate counterclockwise until the pointer 3 pointed in about the direction indicated by dotted line 7. Such rotation of the pointer is prevented by a stop 8 against which the pointer 3 rests at or below the lower end of the useful part of the scale 4.

It is assumed that the flux field to be measured has a direction represented by the horizontal axis line 9—9 at right angles to the shaft 2, and that the positive pole of such field is to the left, represented by the plus marks at the left extremity of axis 9—9, while the minus marks at the right extremity of axis 9—9 represent the negative pole of the field to be measured. It is noted that the instrument is positioned in the field to be measured with the armature field partially opposing the measurement field as shown. The instrument torque produced by the two fields is clockwise due to the attraction of unlike poles and repulsion of like poles. This instrument torque is a maximum when the armature and measurement fields have their axes at right angles. It will be shown that by utilizing such an instrument over the range represented by the calibrated portion of the scale in Fig. 1, very high accuracy of measurement over a limited range of field strength is possible.

Referring to the curves of Fig. 2, the ordinates represent torque and the abscissas represent deflection angle of the armature of an instrument arranged as in Fig. 1. The 0 angle abscissa point represents the theoretical position of the armature with the pointer 3 pointing to the left along the axis 9—9, Fig. 1. Minus 30 degrees represents the position of the pointer 3 if lying along line 7, Fig. 1, with the spring torque zero. The position of the pointer when as held against stop 8 is at about the 50-degree point of the abscissa. Thus, angles A and B, Figs. 1 and 2, are assumed to be 30 and 50 degrees, respectively, although other angles of the same general order may be used. The straight line C, Fig. 2, represents the counterclockwise torque of spring 5 for different armature positions. The sine wave shaped curve D represents clockwise instrument torque for different armature positions for a given strength of the measurement field, and is about the minimum strength of field that could be measured with the instrument as thus adjusted. E, F and G represent the upper portions of sine wave instrument torques for successively higher values of the measurement field. If the complete curves were drawn, their zero torque points would coincide with the zero torque points of curve D at 0 and 180 degrees. If curve D represents a measurement field strength of 100%, curves E, F, and G represent measurement field strengths of 105, 110, and 120%, respectively. The instrument deflection corresponding to these conditions will be where the spring and instrument torques are equal or where the spring torque line D crosses the instrument torque curves. Such scale distribution is indicated in Fig. 2 and lies between 66 and 96 degrees. Fig. 2 also indicates one reason why the pointer is blocked against counterclockwise rotation at about 50 degrees in this case. If it were not so blocked, the 100% measurement field would be insufficient to overcome the spring torque below about 45 degrees and no indication would be produced.

If the instrument is being used to measure magnets, any magnet whose torque curve does not reach the spring torque line C will produce no indication and will ordinarily be discarded. It is also evident that if the pointer were allowed to return to the position of zero spring torque, it would attempt to rotate counterclockwise from that point in the presence of the measurement field.

It is seen that the field strength measurements over the range for which the particular instrument is adjusted give a wide scale distribution over a range where the instrument torque is near its maximum and, thus, high accuracy and high precision measurements are possible over this particular range. The effect of other adjustments can be readily ascertained. For instance, with the same spring tension but with the natural instrument zero coinciding with the zero instrument torque point, the spring torque would be as represented by dash line H, and the much reduced corresponding scale distribution would be as represented at I.

For best utilization of the invention the negative suppression angle A should be of the order of 30 degrees and the spring torque should be slightly less than the minimum instrument torque to be measured at a deflection around 60 degrees, and the pointer should be blocked upscale below this point where the instrument torque is at least equal to the spring torque.

Fig. 3 shows the appearance of an instrument embodying my invention as constructed for the factory testing of small permanent magnets, such as used in direct current measuring instruments, with one of the magnets 10 in testing position. The instrument structure as removed from its carrying case is represented in Fig. 4 and comprises a frame 11 to which is secured a support 12 for the lower bearing jewel screw 13 and tension adjusting device 14 for the return spring 5. Another support 16 is secured to the upper surface of frame 11 for holding the instrument scale plate 17. The upper end of the instrument shaft 2 is pivoted in a top jewel screw 18 secured in a supporting structure 19 which rises from the upper surface of frame 11 and which straddles and partially surrounds the shaft 2. The upper reduced size portion 20 of the structure 19 extends above the upper inner cover surface 21 of the case shown in Fig. 3. Below such cover 21 the instrument pointer 3 projects from shaft 2 and is bent upward so as to extend over the scale 4 on the upper surface of scale plate 17 where it is exposed to view through a window 22 in cover part 21 (Fig. 3). The moving armature assembly is preferably damped as by means of an aluminum vane 23 secured to the shaft 2 moving in the air gap of a permanent magnet 24 supported from the under side of frame 11. Magnet 24 should be designed to avoid leakage flux except across the gap into which vane 23 extends. The pointer stop for blocking the pointer upscale may be secured to the frame 16 at 8. However, its location is not important. For instance, I might utilize the damping vane 23 and some stationary part of the instrument for this purpose. The polarized armature 1 is of small diameter and volume and may comprise an upper portion of shaft 2. It is positioned above the surface of the cover 21 (Fig. 3) so as to facilitate bringing magnets to be tested within its influence.

The polarized rotor should have special magnetic characteristics and a material suitable for my purposes is made from an alloy of silver, manganese and aluminum such as is described in United States Letters Patent No. 2,247,804, July 1, 1941, to Faus. This material has a high coercive force of the order of 6700 which permits its use in fields as strong as 5000 gauss with satisfactory performance and without demagnetization. It has a low maximum permeability of the order of 1.11. Because of its special characteristics and small volume, the rotor 1 produces a minimum of disturbance on the field to be measured and yet is strongly influenced by such field in the measurement operation previously described. The size of the armature 1 is considerably exaggerated in Fig. 1. Ordinarily this armature will be very small, for example, ⅛ inch in length and less than 1/16 inch in diameter.

Secured on the cover 21, Fig. 3, and shown removed in Fig. 4 is a thimble-like protective cover and gig 26 into which the upper end of shaft 2 with its armature 1 and upper bearing parts 18 and 20 extend when the instrument is assembled in the case. The particular shape or formation of the gig will depend upon the shape and nature of the permanent magnets to be tested. In the example described the permanent magnet 10 shown in test position, Fig. 3, has a circular armature air gap and holes as at 27 for assembly of such magnet in the instrument for which it is intended. Hence, the gig 26 for such magnets will have its cover part 26 of an outer diameter to fit easily within the circular gap of the magnet and will have dowel pins as at 28 positioned to enter the holes 27 in the magnet 10. Hence, all magnets of similar construction and size will always be placed in exactly the same test position with respect to armature 1 which, of course, is centered within the gig 26 in the gap of the magnet under test when the latter is placed on the gig in test position. All parts of the magnetometer with the exception of armature 1 which are in close proximity to the armature will be made of nonmagnetic material so as not to distort or modify the field being measured or otherwise influence the measurement.

In placing magnets on the gig 26 to be tested, they will be so placed that their fields oppose the field of the armature 1 as explained in connection with Fig. 1. In case a mistake is made and the magnet 10 under test is reversed from its correct test position, no harm is done. The instrument pointer 3 will remain against its zero stop and correct measurement may be had by reversing the magnet 10.

In practice a few preliminary tests and adjustments will generally be necessary to adjust the magnetometer for the particular type and size of magnets or other field to be measured. After such adjustments the magnets may be rapidly tested by placing them in test position and noting the instrument deflection. Magnets which are too weak are discarded; those which are too strong may be knocked down and retested until within the range of strength desired. All magnets within the desired strength may be classified as to exact strength with a high degree of accuracy.

When testing magnets for use in measuring instruments as in the example given, the scale 4 may be conveniently calibrated in gram centimeters torque for a one-ampere turn armature excitation. Thus, in Fig. 1, the scale is calibrated from 0.10 to 0.15 gram centimeters. If the magnet 10, Fig. 3, gives a reading of 0.12 on such scale when tested, it means that such magnet when used with a moving coil armature in an electrical measuring instrument will produce 0.12 gram centimeters torque with one-ampere turn armature coil excitation. If the magnets tested are classified accordingly, the information becomes of assistance in the future construction of the instrument in which the magnet is to be used, such, for instance, as selecting the proper zero return spring and number of turns in the armature coil, etc.

While a particular example of the use of my invention for the testing of permanent magnets has been given, the measurement principles explained in connection with Figs. 1 and 2 are of general application for the precision measurement of unidirectional fields in general.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A magnetometer comprising a pivoted shaft having thereon a pointer and an armature polarized at right angles to the shaft, a scale with which said pointer cooperates, a stop for said shaft, a spring for rotatively biasing the shaft with its pointer downscale against said stop such position being referred to as the pointer stop position, said spring being adjusted such that if the stop were removed the spring would rotate the shaft and pointer further in a downscale direction through an angle of the order of 80 degrees from the pointer stop position, said instrument being adapted to be placed in a unidirectional magnetic field to be measured with its shaft at right angles to such field and with the polarized armature, in the pointer stop position thereof, partially opposing such field and with its polarized axis at an angle of the order of 50 degrees to the direction of such field and with such field producing upscale torque on said armature.

2. A magnetometer for testing permanent magnets comprising a pivoted shaft having a pointer and polarized armature thereon, said armature being polarized in a direction at right angles to the shaft, a scale with which the pointer cooperates, a stop for such armature assembly, a spring for rotatively biasing the armature assembly in a downscale direction against said stop, said position being referred to as the pointer stop position, said spring being adjusted such that if the stop were removed the spring would turn the shaft further in a downscale direction through an angle of the order of 80 degrees, and stationary nonmagnetic jig means adapted to receive a permanent magnet to be tested and to position said magnet relative to the magnetometer such that the field produced by the magnet will extend through the polarized armature at right angles to its axis of rotation, and at an opposing angle of the order of 50 degrees to its axis of polarization when in the pointer stop position and will produce an upscale torque thereon.

LEWIS I. MENDELSOHN.

REFERENCES CITED

The following references are of record in the file of this patent:

UNITED STATES PATENTS

| Number | Name | Date |
|---|---|---|
| 1,187,054 | Everest | June 13, 1916 |

FOREIGN PATENTS

| Number | Country | Date |
|---|---|---|
| 276,652 | Great Britain | May 24, 1928 |